United States Patent
Lee

(10) Patent No.: US 10,137,793 B2
(45) Date of Patent: Nov. 27, 2018

(54) WIPER RING AND CHARGING PILE USING SAME

(71) Applicant: MiiCs & Partners (Shenzhen) Co., Ltd., Shenzhen, Guangdong (CN)

(72) Inventor: Chia-Yen Lee, New Taipei (TW)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 318 days.

(21) Appl. No.: 14/862,419

(22) Filed: Sep. 23, 2015

(65) Prior Publication Data

US 2017/0080812 A1 Mar. 23, 2017

(51) Int. Cl.
| B60L 11/18 | (2006.01) |
| B65H 57/06 | (2006.01) |
| B65H 75/38 | (2006.01) |
| B65H 75/44 | (2006.01) |

(52) U.S. Cl.
CPC .......... B60L 11/1824 (2013.01); B65H 57/06 (2013.01); B65H 75/38 (2013.01); B65H 75/4402 (2013.01); *B65H 2301/5115* (2013.01); *B65H 2701/34* (2013.01)

(58) Field of Classification Search
CPC ............... B65H 75/4402; B65H 57/06; B65H 2301/5115; B65H 2701/34; B65H 75/38; B60L 11/1824
USPC .......................................................... 242/397
See application file for complete search history.

(56) References Cited

U.S. PATENT DOCUMENTS

| 4,842,108 A * | 6/1989 | Anderson | B65H 75/425 191/12.2 A |
| 5,855,262 A * | 1/1999 | Jackson | B60L 11/1816 191/12.4 |
| 6,035,983 A * | 3/2000 | Benner | B65H 75/38 191/12.2 R |
| 6,308,957 B1 * | 10/2001 | Wright | F16J 15/006 277/355 |
| 6,318,728 B1 * | 11/2001 | Addis | F01D 11/001 277/355 |
| 6,344,740 B1 * | 2/2002 | Haberlein | B65H 57/12 324/226 |
| 6,471,212 B1 * | 10/2002 | Dierker | F16J 15/3288 277/355 |
| 7,172,150 B1 * | 2/2007 | Hutchison, II | B65H 75/4449 191/12.2 R |
| 7,931,276 B2 * | 4/2011 | Szymbor | F16J 15/3288 277/355 |
| 9,347,333 B2 * | 5/2016 | Mindock, III | F01D 11/003 |

(Continued)

Primary Examiner — Michael R Mansen
Assistant Examiner — Mark K Buse
(74) Attorney, Agent, or Firm — ScienBiziP, P.C.

(57) ABSTRACT

A wiper ring provided includes a ring body and a number of brushes. The ring body has an outer side surface and an inner side surface opposite to the outer side surface. The wiper ring includes a mounting portion located on the outer side surface. The ring body is mounted to a cable through-hole of a charging pile via the mounting portion. The number of brushes are arranged on the inner side surface. Each of the number of brushes has an end fixed to the inner side surface of the ring body and the other end, opposite to the end, faces a center of the ring body or a defined point of the ring body. The number of brushes cooperatively form a through-hole having a diameter less than that of the cable for allowing a cable to pass through. A charging pile using same is also provided.

10 Claims, 4 Drawing Sheets

(56) References Cited

U.S. PATENT DOCUMENTS

| | | | |
|---|---|---|---|
| 2004/0016839 A1* | 1/2004 | Weir | G03B 17/30 |
| | | | 242/348.4 |
| 2004/0150165 A1* | 8/2004 | Grondahl | F16J 15/3292 |
| | | | 277/355 |
| 2005/0161548 A1* | 7/2005 | Naneff | B60R 13/105 |
| | | | 242/385 |
| 2009/0072486 A1* | 3/2009 | Datta | F16J 15/3288 |
| | | | 277/355 |
| 2010/0277127 A1* | 11/2010 | Flack | B60L 11/1816 |
| | | | 320/137 |
| 2015/0354707 A1* | 12/2015 | Inoue | F01D 11/00 |
| | | | 277/355 |

* cited by examiner

WIPER RING AND CHARGING PILE USING SAME

FIELD

The subject matter herein generally relates to wiper rings and charging piles using same.

BACKGROUND

Charging pile is always used to power electric vehicles via a cable coupling the charging pile with the electric vehicles.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
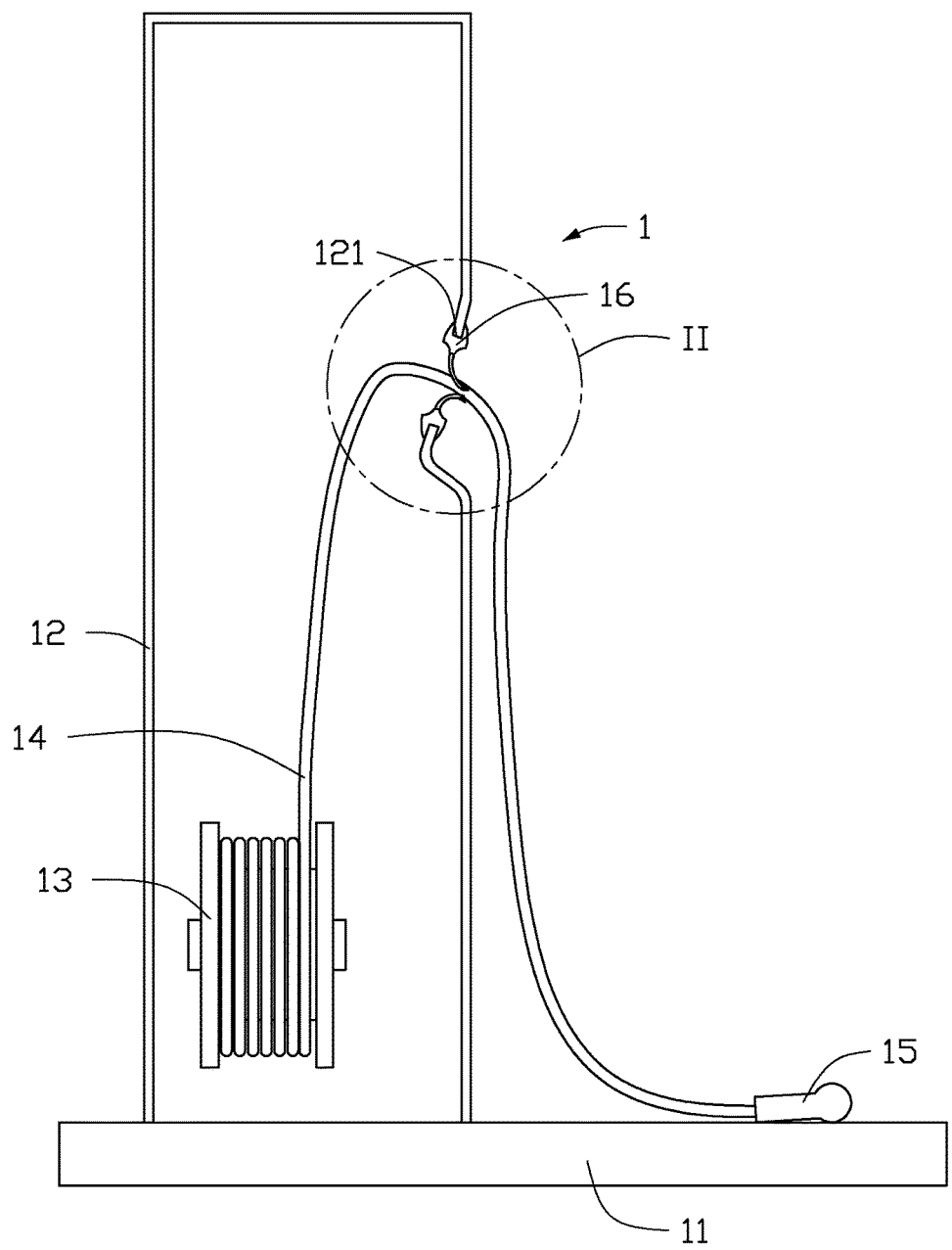
FIG. 1 is a diagrammatic view of an embodiment of a charging pile.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure relates to a wiper ring including a ring body, a mounting portion, a charging pile and a number of brushes. The ring body has an outer side surface and an inner side surface opposite to the outer side surface. The mounting portion is located on the outer side surface. The charging pile forms a cable through hole which is coupled to the ring body through the mounting portion. The number of brushes are arranged on the inner side surface of the ring body. Each of the number of brushes has an end fixed to the inner side surface of the ring body and the other end, opposite to the end, faces a center of the ring body or a defined point of the ring body. The number of brushes cooperatively form a through-hole having a diameter for allowing a cable to pass through. The diameter of the through-hole is less than that of the cable.

The present disclosure relates to a charging pile including a base plate, a charging pile body, a winder, a cable and a wiper ring. The charging pile body is mounted on the base plate. The charging pile body defines a cable through-hole. The winder is received in the charging pile body and rotatablely coupled to the charging pile body. One end of the cable is received in the charging pile body and twining around the winder, and the other end of the cable is passing through the cable through-hole to expose out of the charging pile body. The charging pile includes a ring body and a number of brushes. The ring body has an outer side surface and an inner side surface opposite to the outer side surface. The wiper ring includes a mounting portion located on the outer side surface. The ring body is mounted to the cable through-hole of the charging pile via the mounting portion. The number of brushes are arranged on the inner side surface of the ring body. Each of the number of brushes has an end fixed to the inner side surface of the ring body and the other end, opposite to the end, faces a center of the ring body or a defined point of the ring body. The number of brushes cooperatively form a through-hole having a diameter for allowing the cable to pass through. The diameter of the through-hole is less than that of the cable.

The present disclosure relates to a wiper ring including a ring body and a number of brushes. The ring body has an outer side surface and an inner side surface opposite to the outer side surface. The wiper ring includes a mounting portion located on the outer side surface. The ring body is mounted to a cable through-hole of a charging pile via the mounting portion. The number of brushes are arranged on the inner side surface of the ring body. Each of the number of brushes has an end fixed to the inner side surface of the ring body and the other end, opposite to the end, faces a center of the ring body or a defined point of the ring body. The number of brushes cooperatively form a through-hole having a diameter for allowing a cable to pass through. The diameter of the through-hole is less than that of the cable.

FIG. 1 shows a charging pile 1. The charging pile 1 can be used to power an electric car. In at least one embodiment, the charging pile 1 can be used to power an electric bicycle or other suitable electric vehicle.

The charging pile 1 can include a base plate 11, a charging pile body 12, a winder 13, a cable 14 and a charger 15.

The charging pile body 12 can be hollow shaped. The charging pile body 12 can cover the base plate 11. The charging pile body 12 and the base plate 11 can cooperatively form an enclosed receiving space (not labeled), such that dust, sand, rain or the like can be avoided to get in the enclosed receiving space. The charging pile body 12 can define a cable through-hole 121 on a sidewall (not labeled) thereof. The cable through-hole 121 can be used to the cable 14 passing through.

The winder 13 can be received in the enclosed receiving space. The winder 13 can be rotatablely coupled to the charging pile body 12.

The cable 14 can be used to couple the winder 13 with the charger 15. One end of the cable 14 can twine around the winder 13, and the other end of the cable 14 can pass through the cable through-hole 121 and further couple with the charger 15, such that the charging pile 1 can be used to power the electric car.

Figure 2:
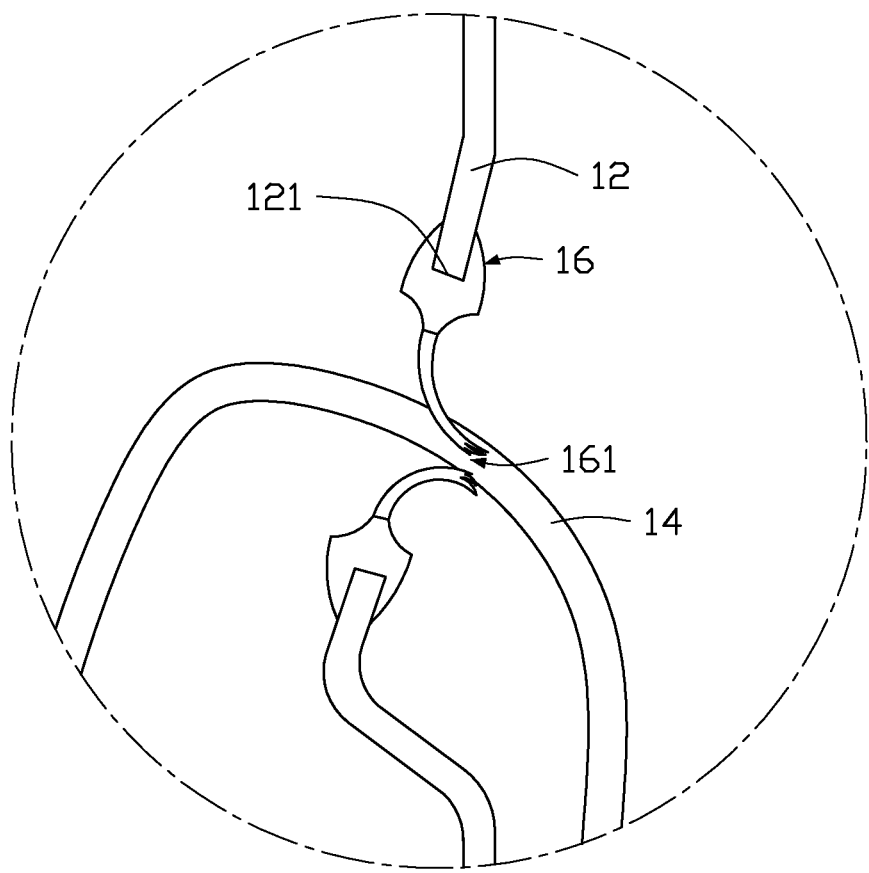
FIG. 2 is an enlarged view of an embodiment of the charging pile taken along a circle II.

FIG. 2 illustrates that the charging pile 1 can further include a wiper ring 16. The wiper ring 16 can be ring-shaped and mounted to the cable through-hole 121. The wiper ring 16 can define a through-hole 161 for allowing the cable 14 to pass through. Before the cable 14 passes through the through-hole 161 and twines around the winder 13, the cable 14 can be cleaned by the wiper ring to get rid of dust, sand, water or the like adhered thereon.

Figure 3:
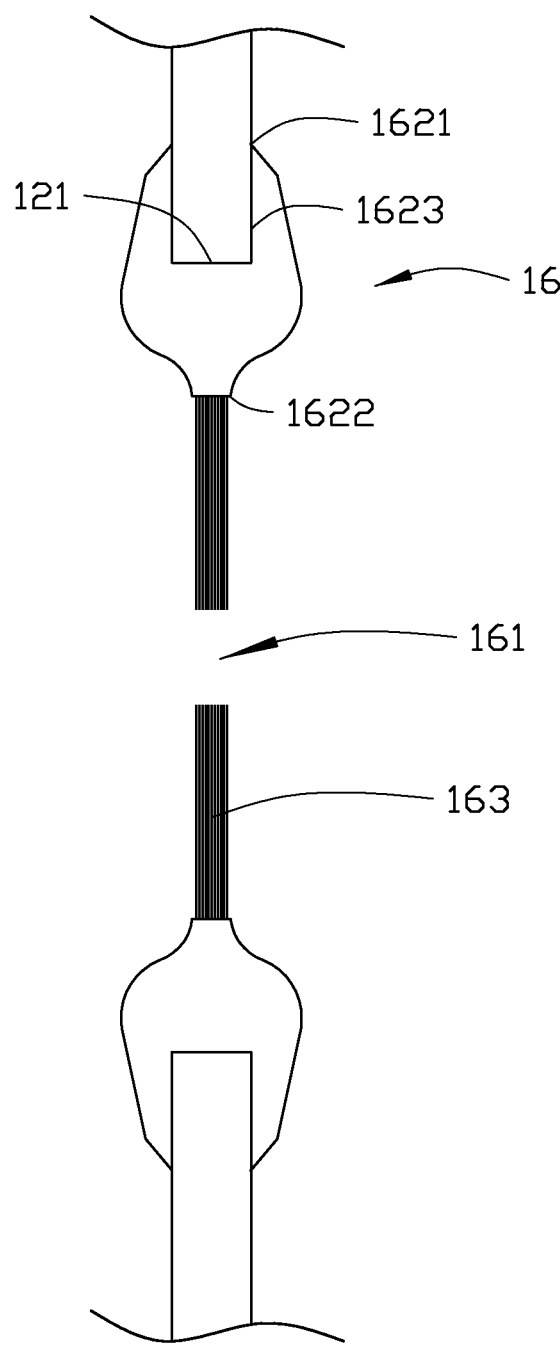
FIG. 3 is a plan view of an embodiment of a wiper ring.
Figure 4:
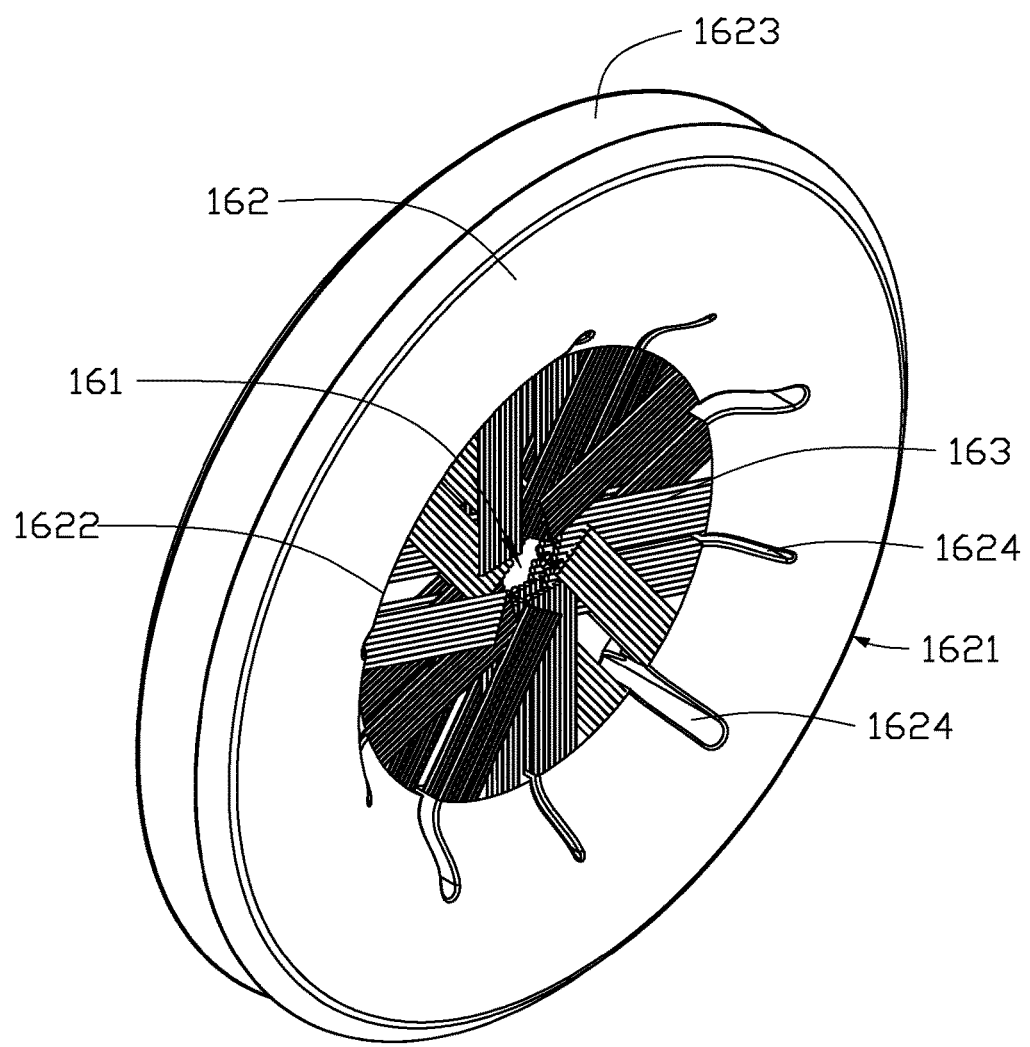
FIG. 4 is an isometric view of an embodiment of a wiper ring.

FIGS. 3 and 4 illustrate that the wiper ring 16 can include a ring body 162. The ring body 162 can have an outer side surface 1621 and an inner side surface 1622 opposite to the outer side surface 1621. The wiper ring 16 can further include a mounting portion 1623 located on the outer side surface 1621. The ring body 162 can be mounted to the cable through-hole 121 via the mounting portion 1623. In at least one embodiment, the mounting portion 1623 can be a ring groove defined along a circumferential periphery of the outer side surface 1621. The ring groove is plugged into by a sidewall of the cable through-hole 121, such that the wiper ring 16 can be mounted to the charging pile body 12. The cable through-hole 121 and the mounting portion 1623 can be any suitable types matched with each other, such as rectangular-shaped, round-shaped, polygon-shaped, or the like, for example, if the cable through-hole 121 is round-shaped, the mounting portion 1623 can be round-shaped accordingly. In at least one embodiment, the mounting portion 1623 can be other suitable shape, such as a paste structure, that is, the mounting portion 1623 can be pasted to the sidewall of the cable through-hole 121 directly, or a buckle structure, that is, if the mounting portion 1623 is a protrusion (not shown), the cable through-hole 121 can be a groove (not shown) accordingly, the protrusion is engaged with the groove such that the ring body 162 can be mounted to the cable through-hole 121.

The inner side surface 1622 of the ring body 162 can be any suitable shape, such as rectangular-shaped, round-shaped, polygon-shaped, or the like. In at least one embodiment, the inner side surface 1622 of the ring body 162 can be substantially round-shaped. The wiper ring 16 can further include a number of brushes 163 arranged on the inner side surface 1622 of the ring body 162. Each of the number of brushes 163 has an end fixed to the inner side surface 1622 of the ring body 162, and the other end, opposite to the end, faces a center of the ring body 162 or a defined point of the ring body 162. The length of each brush 163 can be substantially less than a distance between the inner side surface 1622 of the ring body 162 and the center of the ring body 162 or the defined point of the ring body 162. The ends of the number of brushes 163 can form the through-hole 161. The diameter of the through-hole 161 can be substantially less than that of the cable 14, such that the dust, sand, water or the like adhered on the cable 14 can be cleaned while the cable 14 passing through the through-hole 161.

The ring body 162 can define a number of expansion grooves 1624 thereon close to the inner side surface 1622. The number of expansion grooves 1624 can both face the center of the ring body 162 or the defined point of the ring body 162. In at least one embodiment, the number of expansion grooves 1624 can have two width sizes, each narrow expansion groove 1624 can locate between each two wider expansion grooves 1624. In at least one embodiment, the shapes and the sizes of the number of expansion grooves 1624 can be same or different. The number of expansion grooves 1624 can be used to absorb deformation of the wiper ring 16 while mounting, such that the wiper ring 16 can be easily mounted or dismounted.

In at least one embodiment, the ring body 162 and the number of brushes 163 can be both made of soft material. The ring body 162 made of soft material such as rubber can be easily mounted or dismounted. The number of brushes 163 made of soft material can easily clean the dust, sand, water or the like adhered on the cable 14 and further protect the surface of the cable 14 from damaging.

When in use, the cable 14 can be pulled out from the charging pile body 12 to charge the electric car. When finishing charging the electric car, the winder 13 can rotate inversely such that the cable 14 can be pulled into the charging pile body 12 and further twined around the winder 13, and the brushes 163 of the wiper ring 16 can clean the dust, sand, water or the like adhered on the cable 14 while the cable 14 passing through the through-hole 161.

The embodiments shown and described above are only examples. Many details are often found in the art such as the features of wiper ring and charging pile using same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A wiper ring configured for being applied in a charging pile, the wiper ring comprising:
   a ring body having a radial outer side surface and a radial inner side surface, the radial inner surface being opposite from the radial outer side surface in a radial direction of the ring body;
   a mounting portion located on the radial outer side surface, the mounting portion being configured for coupling the wiper ring to the charging pile; and
   a plurality of brushes arranged on the radial inner side surface of the ring body, each of the plurality of brushes having an end fixed to the radial inner side surface of the ring body and the other end, opposite to the end, facing a center of the ring body or a defined point of the ring body;
   wherein the plurality of brushes cooperatively form a through-hole having a diameter for allowing a cable of the charging pile to pass through, and the diameter of the through-hole is less than that of the cable; and
   wherein the mounting portion is a ring groove defined along a circumferential periphery of the radial outer side surface, the ring groove is plugged into by a sidewall of the cable through-hole.

2. The wiper ring of claim 1, wherein a length of each brush is less than a distance between the radial inner side surface of the ring body and the center of the ring body or the defined point of the ring body.

3. The wiper ring of claim 1, wherein the ring body defines a plurality of expansion grooves thereon close to the radial inner side surface, the plurality of expansion grooves both face the center of the ring body or the defined point of the ring body.

4. The wiper ring of claim 3, wherein the plurality of expansion grooves have two width sizes, each narrow expansion groove locates between each two wider expansion grooves.

5. The wiper ring of claim 1, wherein the ring body and the plurality of brushes are both made of flexible materials.

6. A charging pile comprising:
a base plate;
a charging pile body mounted on the base plate, a cable through-hole being defined on the charging pile body;
a winder received in the charging pile body and rotatably coupled to the charging pile body;
a cable, one end of the cable received in the charging pile body and twining around the winder, and the other end of the cable passing through the cable through-hole to expose out of the charging pile body; and
a wiper ring, comprising:
a ring body having a radial outer side surface and a radial inner side surface, the radial inner surface being opposite from the radial outer side surface in a radial direction of the ring body;
a mounting portion located on the radial outer side surface, the ring body being mounted to the cable through-hole of the charging pile via the mounting portion; and
a plurality of brushes arranged on the radial inner side surface of the ring body, each of the plurality of brushes having an end fixed to the radial inner side surface of the ring body, and the other end, opposite to the end, facing a center of the ring body or a defined point of the ring body;
wherein the plurality of brushes cooperatively form a through-hole having a diameter for allowing the cable to pass through, and the diameter of the through-hole is less than that of the cable; and
wherein the mounting portion is a ring groove defined along a circumferential periphery of the radial outer side surface, the ring groove is plugged into by a sidewall of the cable through-hole.

7. The charging pile of claim 6, wherein a length of each brush is less than a distance between the radial inner side surface of the ring body and the center of the ring body or the defined point of the ring body.

8. The charging pile of claim 6, wherein the ring body defines a plurality of expansion grooves thereon close to the radial inner side surface, the plurality of expansion grooves face the center of the ring body or the defined point of the ring body.

9. The wiper ring of claim 8, wherein the plurality of expansion grooves have two width sizes, each narrow expansion groove locates between each two wider expansion grooves.

10. The charging pile of claim 6, wherein the ring body and the plurality of brushes are both made of flexible materials.

* * * * *